United States Patent [19]

Makino

[11] Patent Number: 5,666,301
[45] Date of Patent: Sep. 9, 1997

[54] MULTIPLIER CARRYING OUT NUMERIC CALCULATION AT HIGH SPEED

[75] Inventor: Hiroshi Makino, Hyogo, Japan

[73] Assignee: Mitsubishi Denki Kabushiki Kaisha, Tokyo, Japan

[21] Appl. No.: 460,948

[22] Filed: Jun. 5, 1995

[30] Foreign Application Priority Data

May 29, 1994 [JP] Japan .................. 6-148008

[51] Int. Cl.⁶ .................. G06F 7/38; G06F 7/52
[52] U.S. Cl. .................. 364/254.01; 364/748.01; 364/757
[58] Field of Search .................. 364/736, 748, 364/749, 754, 757, 758, 760

[56] References Cited

U.S. PATENT DOCUMENTS

| | | | |
|---|---|---|---|
| 4,594,679 | 6/1986 | George et al. | 364/754 |
| 4,953,119 | 8/1990 | Wong et al. | 364/754 |
| 4,985,848 | 1/1991 | Pfeiffer et al. | 395/505 |
| 5,185,713 | 2/1993 | Kobunaya | 364/748 |
| 5,268,854 | 12/1993 | Ikumi | 364/736 |

OTHER PUBLICATIONS

"Graphics Processing with the 88110 RISC Microprocessor", Julie Shipnes, 1992 IEEE.

*Primary Examiner*—Chuong D. Ngo
*Attorney, Agent, or Firm*—Lowe, Price, LeBlanc & Becker

[57] ABSTRACT

Luminance value data including data of R, G, and B and data α representing transparency, each of 8 bits, and a coefficient expressed by floating-point data are directly applied to an operation unit. The operation unit includes four 8×8 bit multiply unit for multiplying 8-bit data of each component forming the luminance value data by the most significant 8 bits of data of the mantissa of the coefficient. An output of each of the multiply units is shifted by corresponding shifters, whereby data of 8 bits is output for each component. Luminance value data of a format identical to that provided is output from the operation unit. Thus, a multiplier is provided having the operation unit that can carry out luminance calculation at high speed.

20 Claims, 9 Drawing Sheets

(A)

← ppunk (B)

← pmul (C)

← ppack

MULTIPLIER CARRYING OUT NUMERIC CALCULATION AT HIGH SPEED

BACKGROUND OF THE INVENTION

1. Field of the Invention

The present invention relates to multipliers, and more particularly to a multiplier that can carry out numeric calculation at high speed for computer graphics technique used for three dimensional graphics.

2. Description of the Related Art

Development in computer graphic techniques has become significant in accordance with increase in the high performance of computers. Computer graphics is a technique that is needed to achieve visualization of various scientific technical calculations and virtual reality. Numeric operation processing of extremely high speed is required for such realization.

In computer graphics, an image of high quality is obtained taking advantage of various shading methods such as a ray tracing method tracking all rays on a screen, a Gouraud shading method, and a Phong shading method. In all these methods, the following calculation is carried out to determine the luminance of various points of an object during the calculation process.

$$I = \sum_{i=1}^{n} Ii \cdot xi \quad (1)$$

where I is the luminance of light at a point of an object, Ii is the luminance value of an incident ray thereat, and Xi is a coefficient value depending upon the angle of a ray, the distance from a light source, reflectance, and transmittance. In general, luminance value Ii is represented by an integer value, and coefficient Xi is calculated by floating-point data for improving the calculation accuracy. Therefore, multiplication of an integer and floating-point data is required in order to carry out the calculation of equation (1). However, there is conventionally no hardware that has the functions to directly carry out this calculation. A method set forth in the following was carried out.

FIG. 8 is a function block diagram of a case where a conventional multiplication of an integer and floating-point data is carried out. Here, the data length is 32 bits. Referring to FIG. 8, luminance value data 1 represented by an integer of 32 bits is applied to a multiply unit 5. Luminance value data 1 is formed of data each of 8 bits including the three primary colors (R: red, G: green, B: blue) and α representing the transparency. Although transparency data α is used in addition to the general three primary colors here, the additional data is not limited to transparency as long as the luminance value data includes the three primary colors.

A coefficient 2 expressed by floating-point data is applied as the other data into multiply unit 5. Here, coefficient 2 is a 32-bit single precision floating-point data conforming to the IEEE standard. More specifically, the most significant bit is a code bit, the next 8 bits are the exponent part, and the lower 23 bits are the mantissa. Coefficient 2 is applied to a fixed-point data unit 3 where the floating-point data is converted into fixed-point data. As a result, fixed-point data 4 consisting of an integer part and a fractional part of a fixed bit length is obtained. This fixed-point data 4 is applied to multiply unit 5 to be multiplied by luminance value data 1. The multiplied result of multiply unit 5 is provided to a format conversion unit 6 to be converted into the format of luminance data. Eventually, luminance value data 7 is obtained.

Fixed-point unit 3 obtains fixed-point data 4 by shifting the mantissa according to the value of the exponent part with respect to floating-point data 2. Multiply unit 5 multiplies each of the four data elements of luminance value data 1 by fixed-point data 4 individually. Format conversion unit 6 extracts and aligns every 8 digit figures of the integer part of the multiplied result from multiply unit 5. Traditionally, there is no dedicated hardware for each of the components of the above-described fixed-point unit 3, multiply unit 5, and format conversion unit 6. The above operation was carried out mainly by software by means of a general purpose operation unit such as an ALU and a multiplier. Such calculation required the operation of extracting and processing individually each byte of the data in addition to shifting or merging operations. There was the problem that the calculation operation was time consuming since so many processing steps had to be carried out.

Dedicated hardwares for multiply unit 5 and format conversion unit 6 have been provided for the purpose of improving the above-described problem. Such an example is disclosed in, for example, "Graphics Processing with the 88119 RISC MICROPROCESSOR", digest of papers, COMPCON '92, pp. 169–174, 1992. According to this document, the function is realized by enabling usage of instructions of punpk, pmul and ppack.

FIG. 9 is a diagram for describing a method of achieving this function disclosed in the same document. Referring to (A), the 32-bit data including transparency data α, R data, G data and B data each of 8 bits is extended to a 64-bit data by an instruction "punpk". By multiplying 8-bit data of Ax by "pmul", multiplication of each luminance value can be realized as shown in (B). Furthermore, each most significant 8 bits of the extended data can be extracted to be converted into the format of the luminance data of 32 bits by a ppack instruction.

The dedicated hardware of the above structure provided for improving the conventional problems encountered in a software process has the advantage of allowing parallel multiplication of four luminance elements such as the general three primary colors plus an additional element such as transparency with a multiplier of 64 bits. There is also an advantage that the time required for calculation can be reduced. However, data conversion of coefficient 2 which is floating-point data into fixed-point data 4 is required. Furthermore, a plurality of calculation steps is required to carry out execution of instructions such as ppack and punpk. Therefore, there was still the problem that the calculation operation is time consuming.

SUMMARY OF THE INVENTION

An object of the present invention is to provide a multiplier that can carry out luminance calculation at high speed.

Another object of the present invention is to provide a multiplier that allows multiplication of luminance value data and floating-point data with a simple structure.

A further object of the present invention is to provide a multiplier that allows luminance calculation at high speed with a simple structure.

Still another object of the present invention is to provide a multiplier that can carry out easily, not only general floating-point calculation, but also luminance calculation, suitable for graphics calculation.

A still further object of the present invention is to provide a multiplier that allows multiplication of luminance value data and floating-point data at high accuracy.

Still a further object of the present invention is to provide a multiplier that can carry out multiplication of a luminance value and single precision floating-point data, and multiplication of luminance value and double precision floating-point data, in addition to single precision and double precision floating-point multiplication, with a small amount of additional hardware.

The above object of the present invention are achieved according to a multiplier including the following components.

More specifically, a multiplier includes a first data input unit for receiving first data 1 representing a luminance value, a second data input unit for receiving second data 2 expressed by floating-point data, an operation unit 11 for carrying out multiplication of the first and second data directly with a hardware, and an output unit 11c for providing the multiplied result 7 in a format identical to that of the input luminance value data.

According to the above operation unit, luminance value data and floating-point data can be calculated directly with a hardware. Therefore, a multiplier that can carry out luminance calculation at extremely high speed can be provided.

Preferably, the first data consists of N components where each component is represented by n1 bits. The second data is represented by m1 bits. The operation unit includes a multiplication preparation unit and N multiply units of n1×n1 bits. The multiplication preparation unit includes a divider for dividing the first data into N components each having n1 bits, and an extractor for extracting the mantissa of n1 bits from the second data.

Since the operation unit is formed of N multiply units of n1×n1 bits, a multiplier that allows multiplication of luminance value data and floating-point data is provided with a simple structure.

According to another aspect of the present invention, a multiplier has the first data defined by N components each represented by n1 bits. The second data is represented by m1 bits. The operation unit includes a multiplication preparation unit and a multiply unit. The multiplication preparation unit includes a divider for dividing the first data into N components each having n1 bits, and an extractor for extracting the mantissa of n1 bits from the second data. The multiply unit includes a first data preparation unit for preparing data of n1×(2N−1) bits in a hardware manner having n1 bits of 0 written between each of the N components. One component is represented by n1 bits, and a total of (N−1) of the n1 bits of 0 is inserted into the N components. Multiplication is carried out between the prepared n1×(2N−1) bits of data and the mantissa of n1 bits extracted from the second data. By inserting n1 bits of data 0 between each data of the N components each expressed by n1 bits, n1×(2N−1) bits of data is prepared by a hardware. Since the prepared data is multiplied by the mantissa of n1 bits extracted from the second data, the required number of multiply units can be reduced to 1. Since only one multiply unit is required with no addition of a particular hardware, a multiplier is provided that allows luminance calculation at high speed with a simple structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
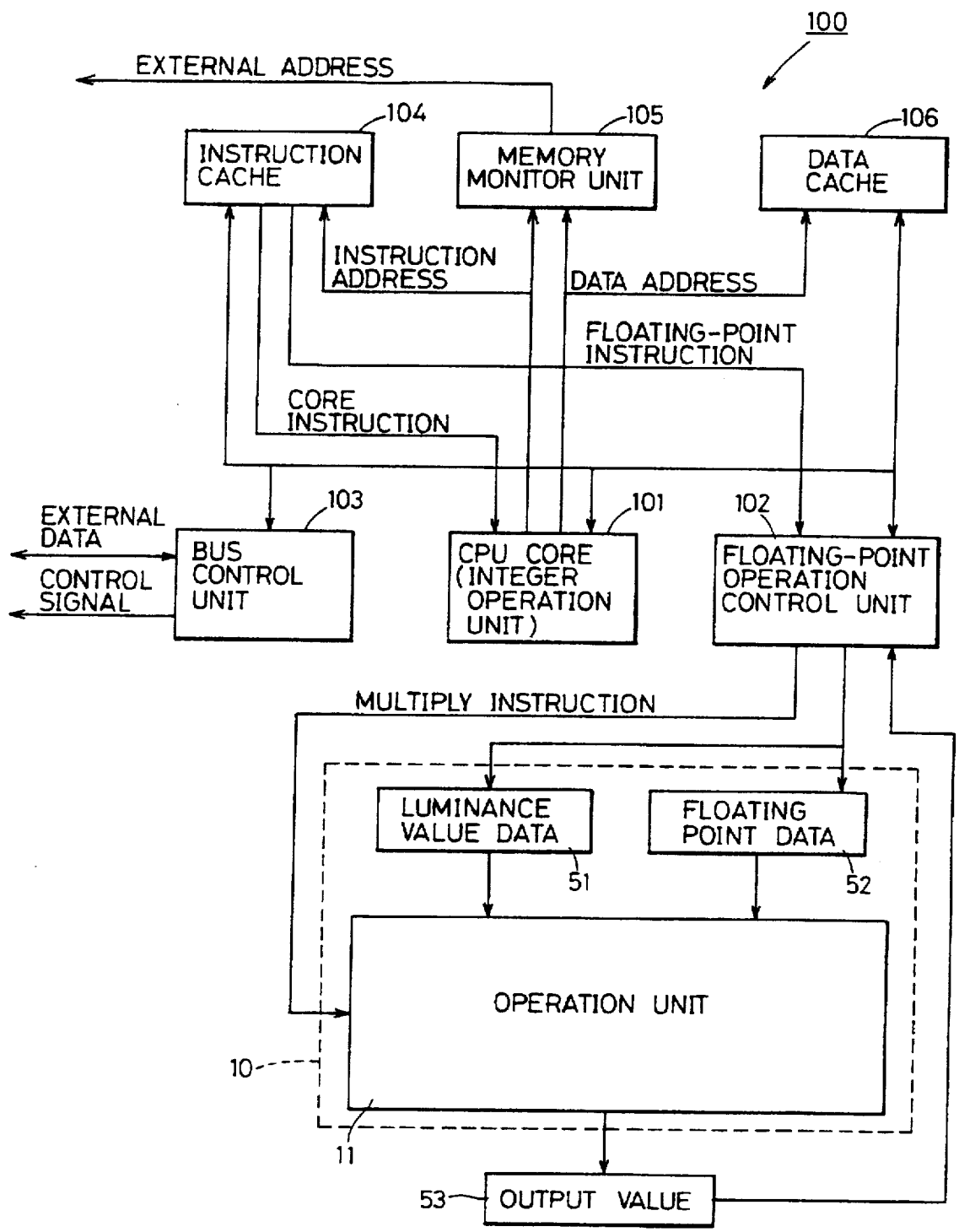
FIG. 1 is a block diagram showing a structure of a microprocessor in which a multiplier of the present invention is incorporated.

Referring to FIG. 1, a microprocessor 100 executing a graphic process at high speed includes an RISC type CPU core 101 for carrying out integer calculation or the like, a floating-point operation control unit 102 connected to CPU core 101 for controlling a multiplier according to the present invention, a bus control unit 103 for input/output of external data and for providing externally a control signal, an instruction cache 104 for storing an instruction, a memory monitor unit 105 for monitoring a memory connected to an external address, and a data cache 106 for storing data.

An externally applied data is provided to instruction cache 104 and data cache 106 via bus control unit 103. A core instruction stored in instruction cache 104 is provided to CPU core 101.

Floating-point operation control unit 102 provides luminance value data and floating-point data applied to multiplier 10. The luminance value data and the floating-point data are input to operation unit 11 through respective input terminals 51, 52. The operation result of operation unit 11 included in multiplier 10 is provided as an output value 53 through output terminal to floating-point operation control unit 102. A multiply instruction for controlling the contents of the multiplication is provided to operation unit 11.

Figure 2:
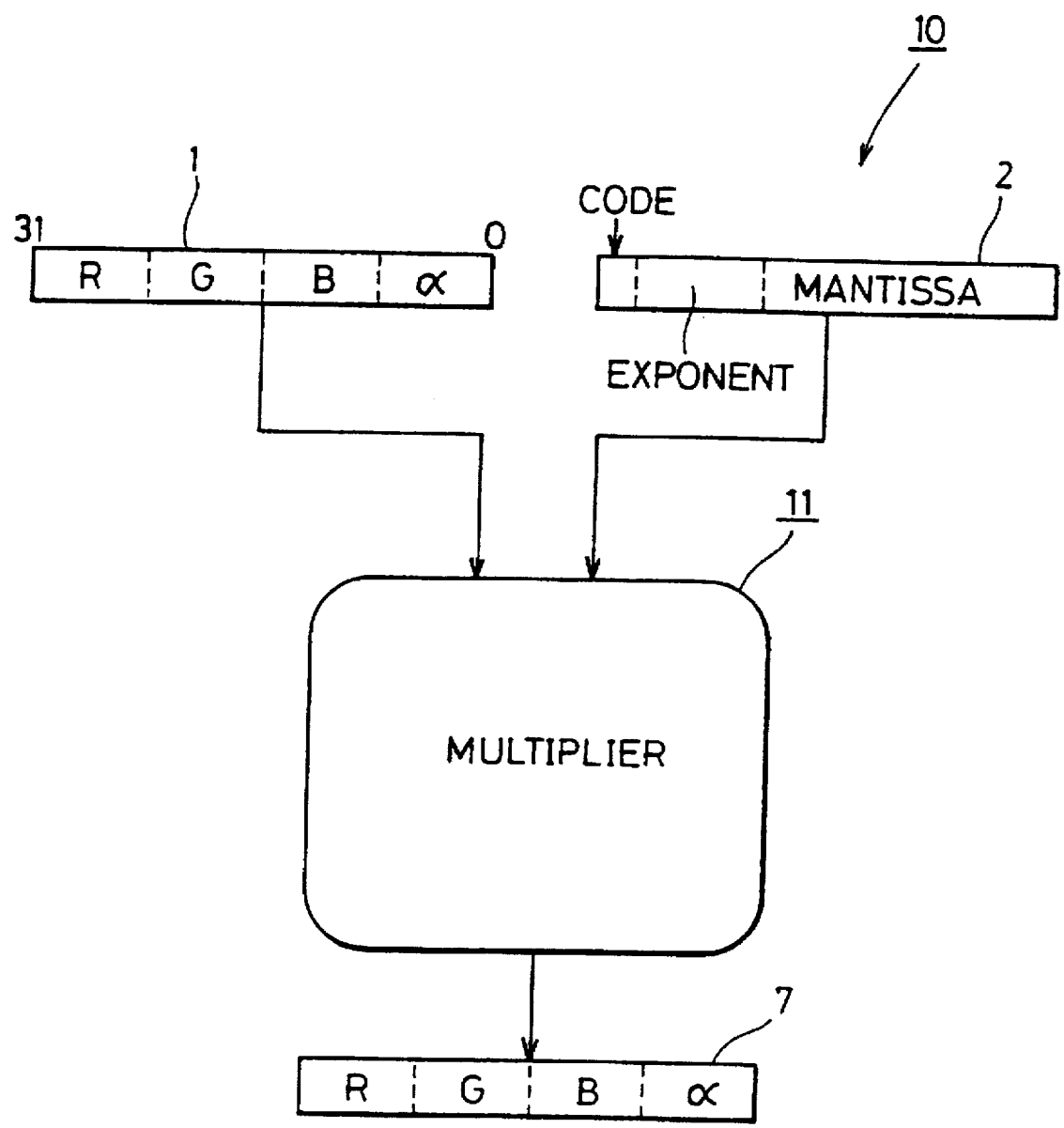
FIG. 2 is a block diagram showing a multiplier according to the present invention.
Figure 8:
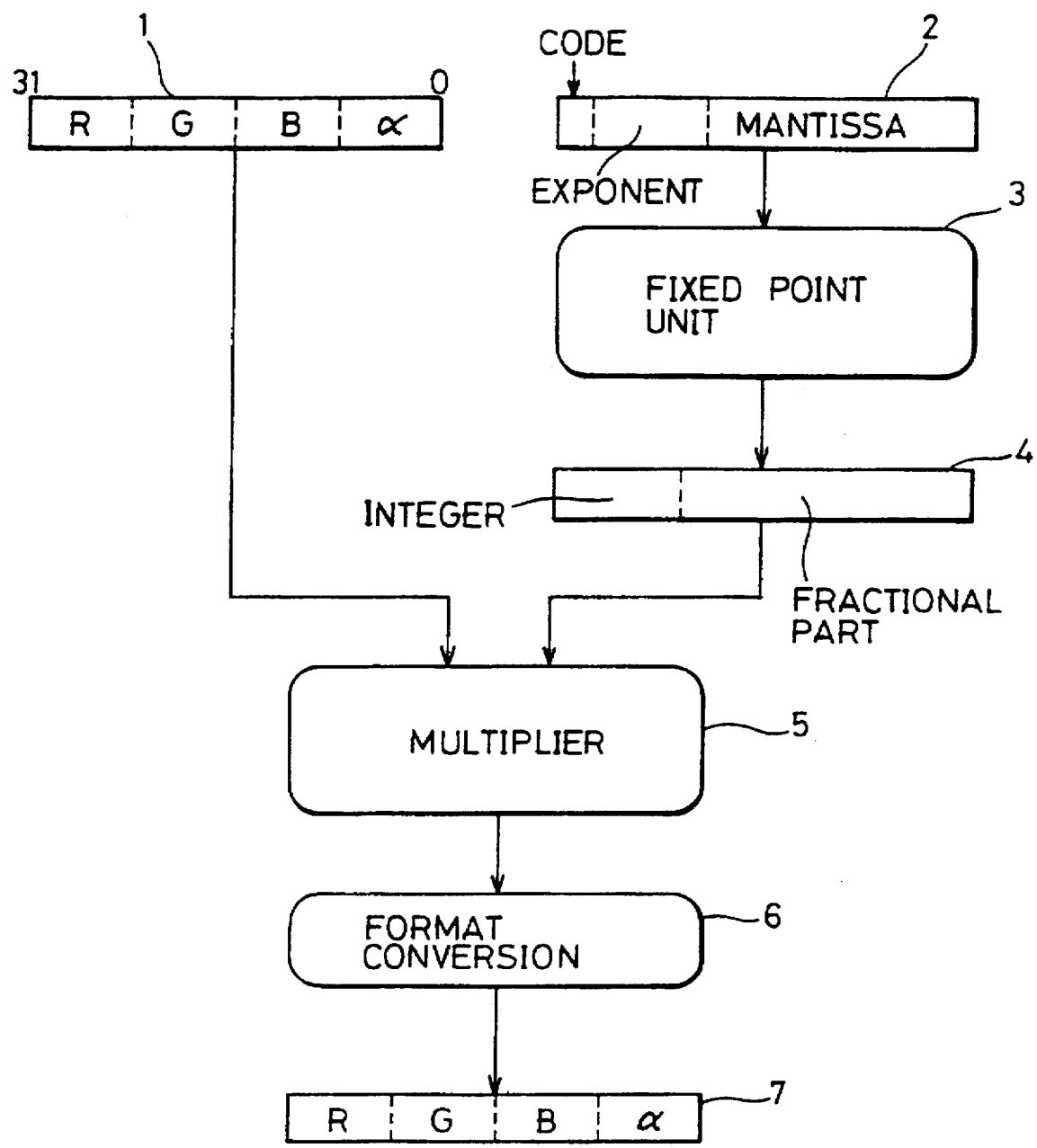
FIG. 8 is a functional block diagram for describing a conventional method of carrying out multiplication of a luminance value.
Figure 9:
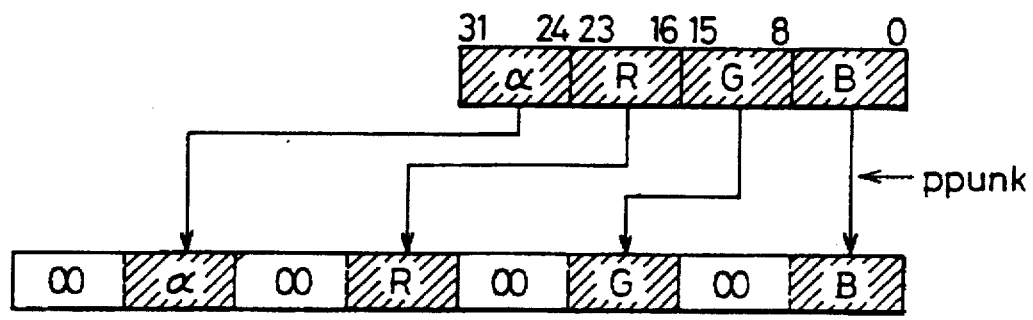
FIG. 9 is a diagram for describing a conventional method of carrying out multiplication of a luminance value.
Figure 9:
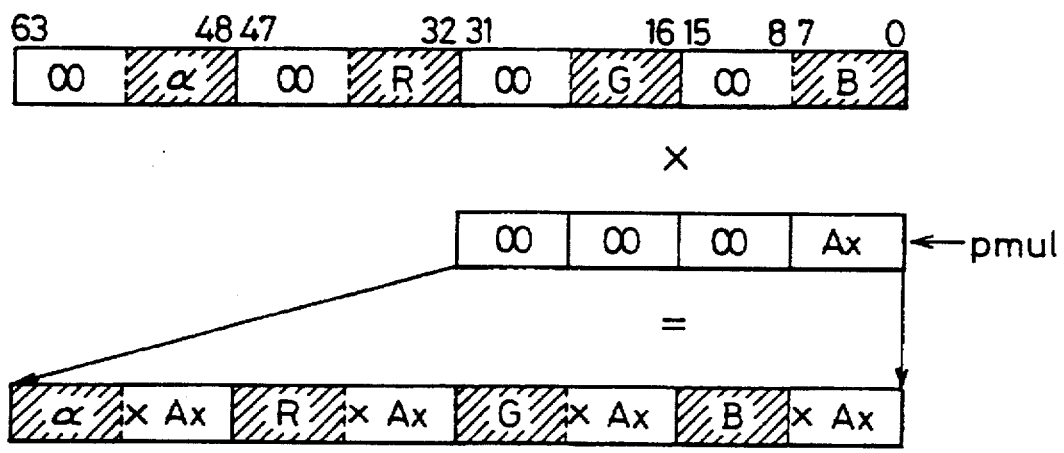
Figure 9:
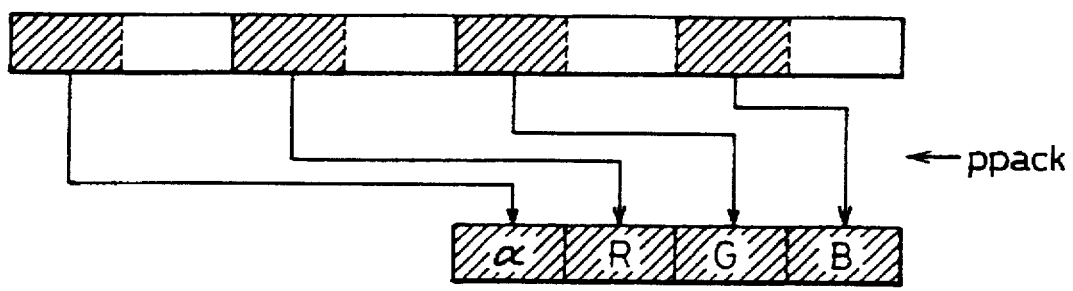

FIG. 2 is a block diagram of multiplier 10 of the present invention corresponding to FIG. 8. Referring to FIG. 2, luminance data 1 applied to multiplier 11, coefficient 2 represented by floating-point data, and luminance value data 7 which is the data output from operation unit 11 are similar to those of the conventional multiplier. Operation unit 11 has the functions of fixed-point unit 3, multiply unit 5, and format conversion unit 6 shown in the conventional multiplier of FIG. 8 integrated in a hardware manner.

With reference to FIG. 2, multiplier 10 includes a first data input terminal 51 for receiving first data 1 representing a luminance value, a second data input terminal 52 for receiving second data 2 expressed by floating-point data, operation unit 11 for carrying out multiplication of the first and second data directly with a hardware, and an output terminal for providing the multiplied result 7 in a format identical to that of the input luminance value data.

Figure 3:
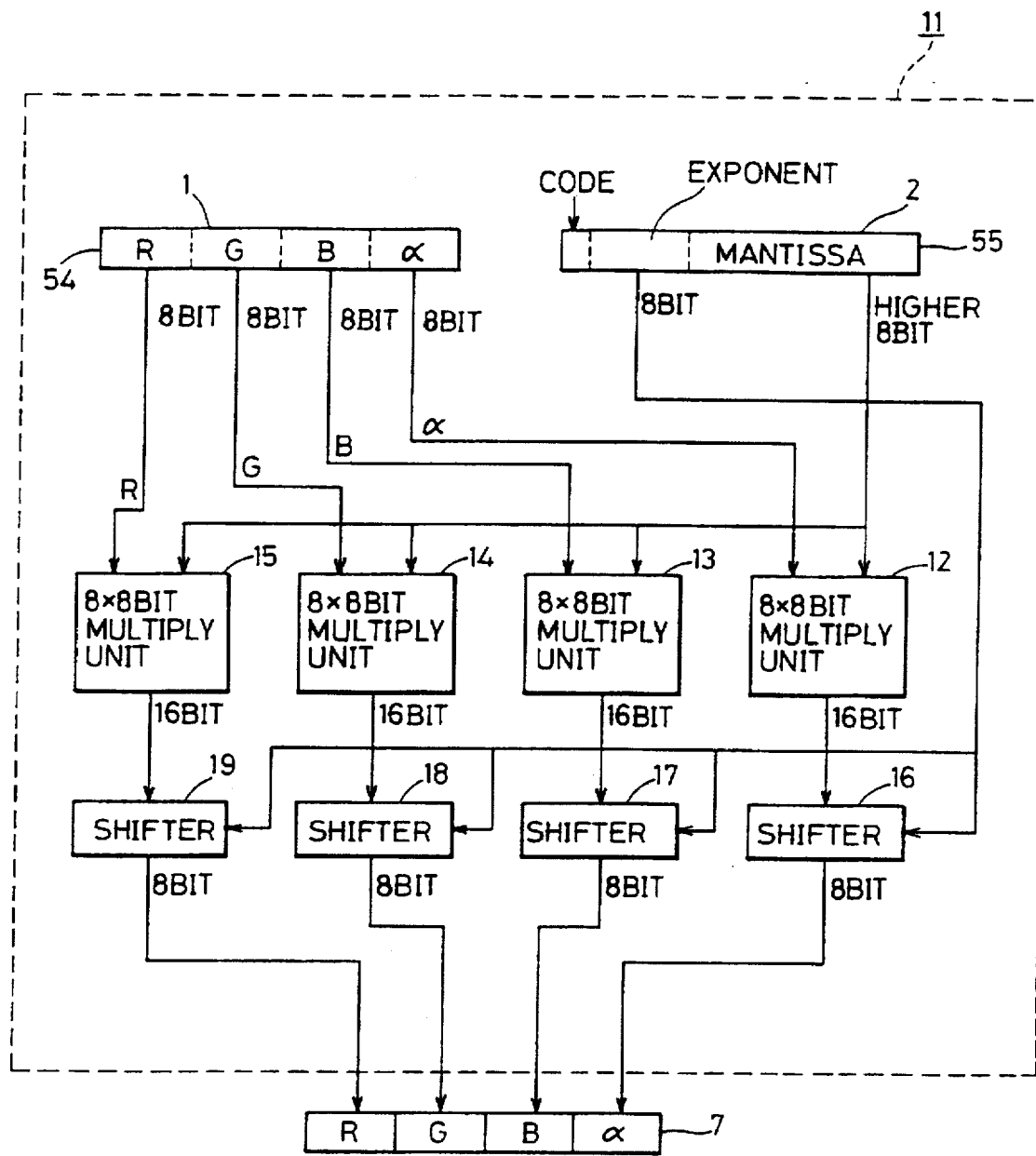
FIGS. 3, 4, 5, 6, and 7 are block diagrams showing the contents of a multiplier according to first, second, third, fourth, and fifth embodiments, respectively, of the present invention.

FIG. 3 is a block diagram showing a structure of operation unit 11 of FIG. 1. Referring to FIG. 3, operation unit 11 includes divider 54 for dividing luminance data 1 into four 8 bits data of transparency α and RGB data, divider 55 for dividing floating point data 2 into exponent and mantissa, four 8×8 bit multipliers 12–15, and four shifters 16–19 connected to 8×8 bit multipliers 12–15, respectively. Since the structures of the dividers 54, 55 in the subsequent embodiment are substantially the same as those in this embodiment, the description thereof is omitted in the subsequent embodiments. Each of 8×8 bit multipliers 12–15 receives value α representing the transparency and 8 bits of data of R, G and B from luminance value data 1, and also the most significant 8 bits from the mantissa of coefficient 2 represented by floating-point data. 8×8 bit multipliers 12–15 calculate the product of each value (8 bits) of a luminance value and the most significant 8 bits of the mantissa of coefficient 2 to provide data of 16 bits to shifters 16–19, respectively.

Since the representation of the most significant bit of 1 is omitted in coefficient 2 when conforming to the IEEE standard, one of the two inputs of each of 8×8 bit multipliers 12–15 is a 8-bit data with the most significant 7 bits of the mantissa of coefficient 2 and 1 added to the most significant bit.

Shifters 16–19 serve to provide the integer part as data of 8 bits by shifting leftwards and rightwards the 16-bit data output of each of 8×8 bit multipliers 12–15 according to the value of coefficient 2 expressed by floating-point data. When coefficient 2 expressed by floating-point data conforms to the IEEE standard, the value of the exponent part has a bias value of 01111111 (=127) added. Therefore, this bias value must be subtracted from the exponent part. This is because the exponent part of 8 bits is defined to take the expression of having 127 added to avoid a negative expression in representing −128–+127 in the IEEE standard. Therefore, the exponent part takes the expression of −1–+254. Since −1 thereof is used for representing an exception such as ∞ or non-numerals, only 0–254 will be meaningful as a numeric value, and expression of a negative numeral can be avoided. Thus, 127 must be subtracted from the value of the exponent part in order to obtain the actual value.

This will be described in detail hereinafter. It is assumed that the components of luminance value 1 is 00001010, and the exponent part having the bias value subtracted is 00000010 and the mantissa of 8 bits having 1 added to the most significant level is 1.0000001 in coefficient 2 expressed by floating-point data. The product of the luminance value and the mantissa is 00001010.00010100. The product is shifted leftwards by 2 bits to result in 0000101000.010100 since the exponent part represents 2 in decimal. Therefore, 00101000 is output as the integer part of 8 bits. Luminance value 7 of 32 bits is obtained by concatenating the 4 components of these 8-bit data.

According to the first embodiment of the present invention, a desired function can be achieved with a simple structure since an operation unit 11 is formed of four 8×8 bit multiply units and four shifters. Since floating-point data can be directly input and processed without the need of controlling a plurality of steps with a software, graphics operation at extremely high speed can be realized with simple programming.

Second Embodiment

Figure 4:
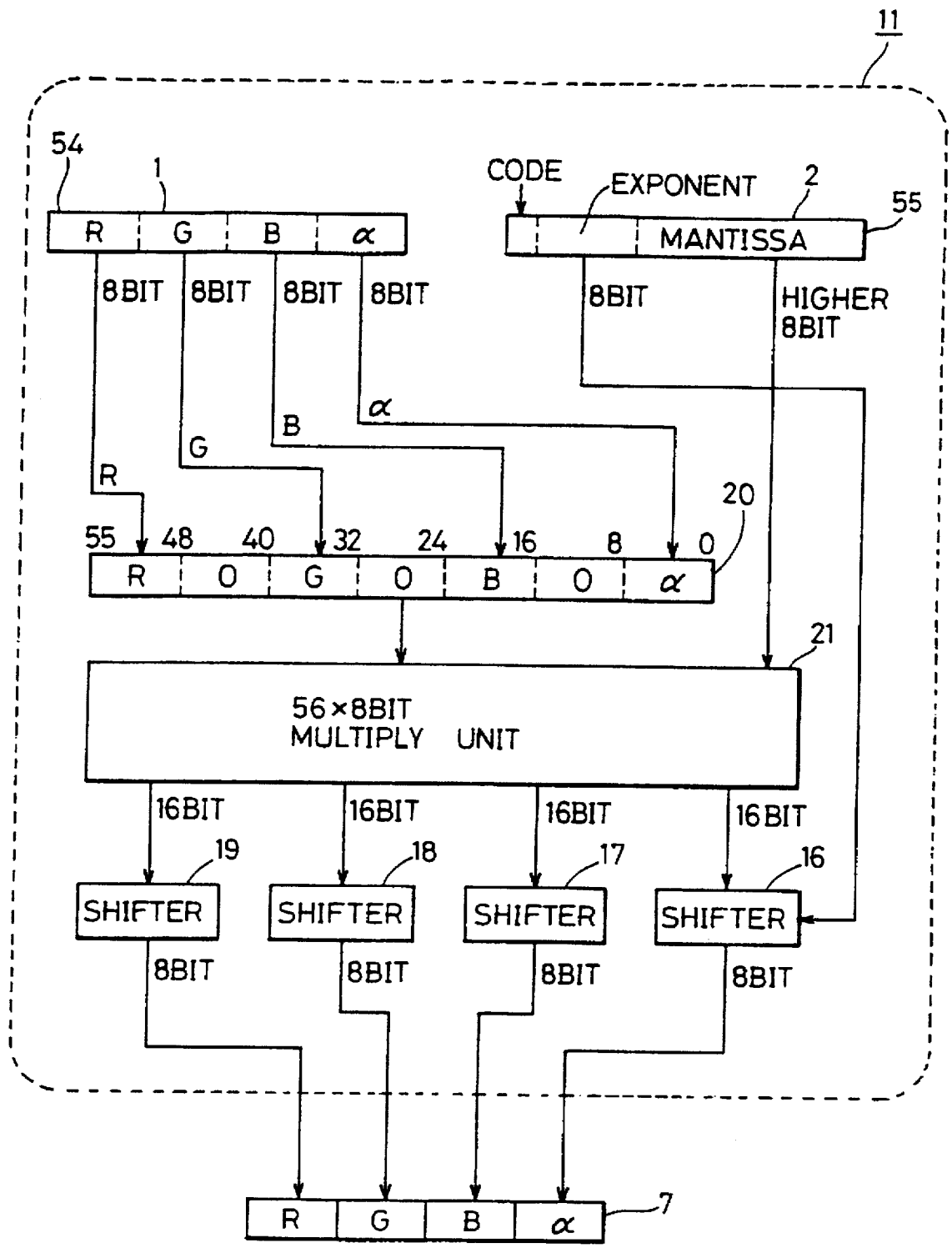

FIG. 4 is a block diagram showing an operation unit according to a second embodiment of the present invention. In the second embodiment, the four 8×8 bit multiply units 12–15 of the first embodiment are united into one 56×8 bit multiply unit 21. Luminance value data 1 formed of four components each represented by 8 bits is converted into 56-bit data 20 before entering 56×8 bit multiply unit 21. 56-bit data 20 is produced by inserting 8 bits of data 0 i.e. 00000000, between each of the components of luminance value data 1. This is achieved in a hardware manner by grounding the data portions representing each of R, G, B, and α.

Similar to the first embodiment, 56-bit data 20 and the upper 8 bits of data of coefficient 2 represented by floating-point data are multiplied in 56×8 bit multiply unit 21. Each component of the luminance value data is represented by 8 bits. The multiplied result of each component will not be mixed even when the 8-bit component is multiplied by data of the most significant 8 bits obtained from coefficient 2 since 8 bits of 0 are prepared at the higher bits of each component in advance. The multiplied result of 56-8 bit multiply unit 21 is delimited into every 16 bits to be provided to each of shifters 16–19. The most significant 8 bits are provided from each of shifters 16–19 to obtain luminance value data 7.

According to the second embodiment of the present invention, the required number of multiply units can be reduced to 1 by inserting 8 bits of data 0 between the components of the luminance value data. No particular hardware is required since 56-bit data 20 can be generated by inserting 0 at appropriate locations of the input of 56×8 bit multiply unit 21. By reducing the number of multiply units to 1 and uniting the input of the mantissa of coefficient 2 to one location, wiring is facilitated to increase the layout efficiency.

Third Embodiment

In a third embodiment of the present invention, an operation unit of the present invention is applied to a floating point multiply unit.

Figure 5:
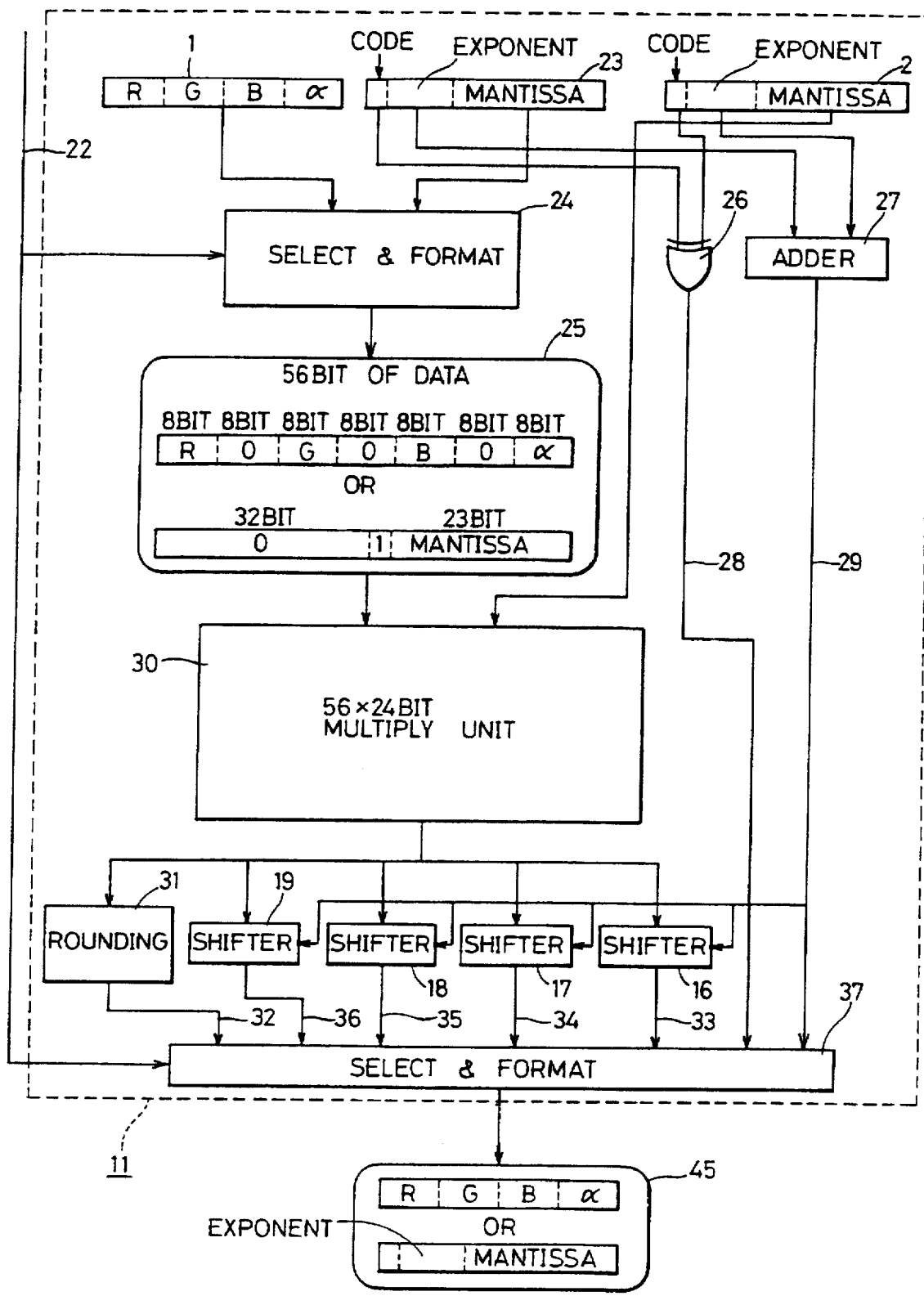

Referring to FIG. 5, a coefficient 23 represented by floating-point data other than coefficient 2 is input. Luminance value data 1 and coefficient 23 represented by floating point data are applied to a select/format conversion unit 24. Select/format conversion unit 24 selects luminance value data 1 or floating point data 23 and applies a format conversion. Selection by select/format conversion unit 24 is carried out on the basis of a value of select signal 22 provided from floating point operation control unit 102 show in FIG. 1. When luminance data 1 is selected in select/ formation conversion device 24, the data is divided into components each of 8 bits. 8 bits of data 0, i.e. 00000000 is inserted therebetween to obtain 56-bit data 25 as in the second embodiment. When coefficient 23 expressed by floating-point data is selected, mantissa data 25 of 56 bits is obtained by adding 1 at the beginning of the mantissa and further adding 32 bits of data 0 at the upper significant level. Here, it is assumed that luminance data 1 and coefficient 23 are selected when select signal 22 is 1 and 0, respectively.

56-bit data 25 is applied to a 56×24 bit multiply unit 30. In addition to 56 bit data 25, 56×24 bit multiply unit 30 also receives 24-bit data having 1 added to the more significant level of the mantissa of coefficient 2. This 24-bit data is multiplied by 56 bit data 25.

Operation unit 11 of the third embodiment includes an XOR circuit 26 for calculating an exclusive OR. The two inputs of the code bits of coefficients 2 and 23 are compared. If they match, 0 is provided as code bit data 28. If they do not match, 1 is provided as code bit data 28. Code bit data 28 indicates the code bit of the product of the floating point multiplication.

Operation unit 11 further includes an adder 27 for calculating the sum of the exponent parts of coefficients 2 and 23. The sum is output as exponent data 29. It is to be noted that adder 27 must include the function of subtracting a bias value from the added result since a bias value is also added. It must further be noted that a value having the bias value subtracted from the exponent part of floating-point data 2 is to be provided to 29 in a luminance calculation operation. This can easily be realized by setting the exponent part of floating-point data 23 to 0. Output 29 provides exponential data which becomes the exponent part of the product in the operation of floating-point multiplication, and a value having the bias value subtracted from the exponent part of floating-point data 2 is output in the operation of luminance calculation.

The output of 56×24 bit multiply unit 30 is provided to a rounding circuit 31 for carrying out a rounding operation on the output result, and also to shifters 16–19. According to the IEEE standard, there are four types of rounding operations including a most approximate value rounding, 0 direction rounding, plus ∞ direction rounding, and minus ∞ direction rounding. Rounding circuit 31 selects an appropriate rounding method. The rounded result is provided to a select/format conversion circuit 37. Similar to the shifters of the above embodiments, shifters 16–19 receive every 16 bits from the least significant bits of the output of 56×24 bit multiply unit 30. Shifting is carried out on the basis of the value of exponential part data 29 which is the output of adder 27, whereby data 33–36 each of 8 bits are output.

The output of rounding circuit 31, outputs 33–36 from shifters 16–19, code bit data 28 which is the output data of XOR circuit 26, and exponent part data 29 which is the output of adder 27 are applied to select/format conversion circuit 37. Similar to select/format conversion circuit 24 of the second embodiment, select/format conversion circuit 37 provides luminance value or floating-point data according to the value of select signal 22. When select signal 22 is 1, luminance value data from each of components 33–36 of the luminance value is output. When select signal 22 is 0, floating-point data is output to an output unit 45 with code bit data 28 as a code bit, exponent part data 29 as the exponent part, and output data 32 of rounding circuit 31 as the mantissa.

According to the third embodiment, calculation of a luminance value is carried out similar to those of the first and second embodiments when select signal 22 is 1. A general floating-point multiplication is carried out when select signal 22 is 0. Therefore, not only the general floating-point calculation, but also calculation of a luminance value is easily carried out. Thus, a multiplier suitable for graphics calculation can be obtained.

Fourth Embodiment

Figure 6:
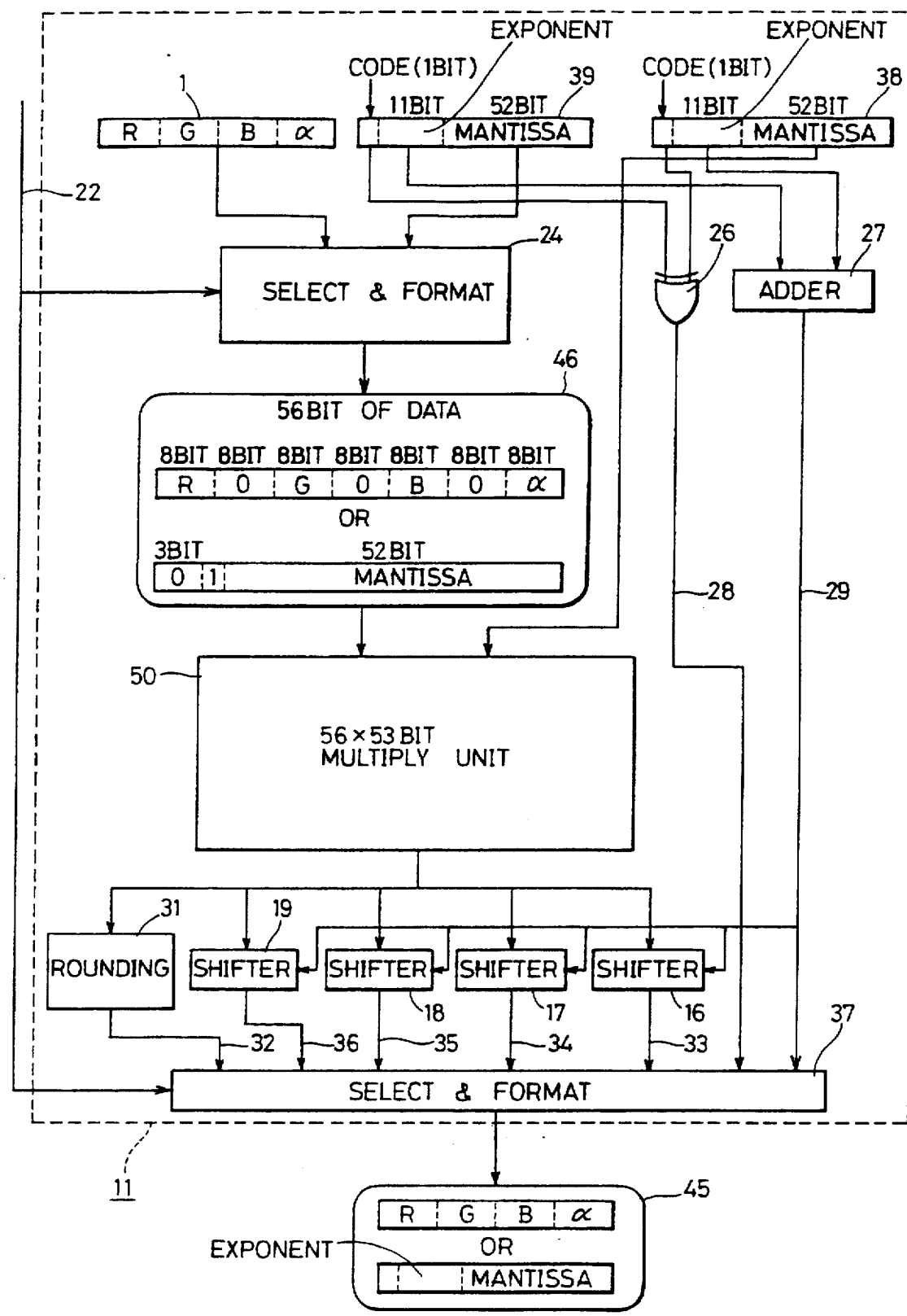

According to a fourth embodiment, an operation unit of the present invention is applied to a double precision floating-point multiply unit. Referring to FIG. 6, floating-point data 38 and 39 applied to operation unit 11 are both data of 64 bits including a code bit of 1 bit, an exponent part of 11 bits, and a mantissa of 52 bits. 56-bit data 46 is processed similar to that of the third embodiment when luminance value data 1 is selected by select/format conversion device 24. However, when floating-point data is selected, data is output having 1 added as the higher significance to the 52 bits of the mantissa of floating-point data 39 and 0 of 3 bits further added to the upper significant bits. Furthermore, 1 is added also to the higher significance of the mantissa of floating-point data 38 to be applied as data of 53 bits. Therefore, multiply unit 50 becomes a 56×53 bit multiply unit.

The structure and operation in which output data from 56×53 bit multiply unit 50 is processed by rounding circuit 31 to obtain output data 45 via select/format conversion unit 37 are similar to those of the above third embodiment.

Output data 45 is the luminance value data of 32 bits and floating-point data of 64 bits similar to input floating-point data 38 and 39 when a luminance value and floating point data, respectively, are selected on the basis of select signal 22.

According to the fourth embodiment of the present invention, the accuracy of floating-point multiplication is improved by converting input data into double precision floating-point data. Furthermore, in contrast to a conventional floating-point multiplier requiring a structure of 53×53 bits, the present embodiment additionally provides the function of graphics operation with a structure of 56×53 bits with almost no increase in the amount of hardware. Therefore, the provision of a graphics operation function can be realized with significant efficiency.

Fifth Embodiment

According to a fifth embodiment of the present invention, an operation unit of the present invention is applied to a floating point multiply unit commonly shared for single precision and double precision. In other words, the present embodiment is a combination of the third and fourth embodiments.

Figure 7:
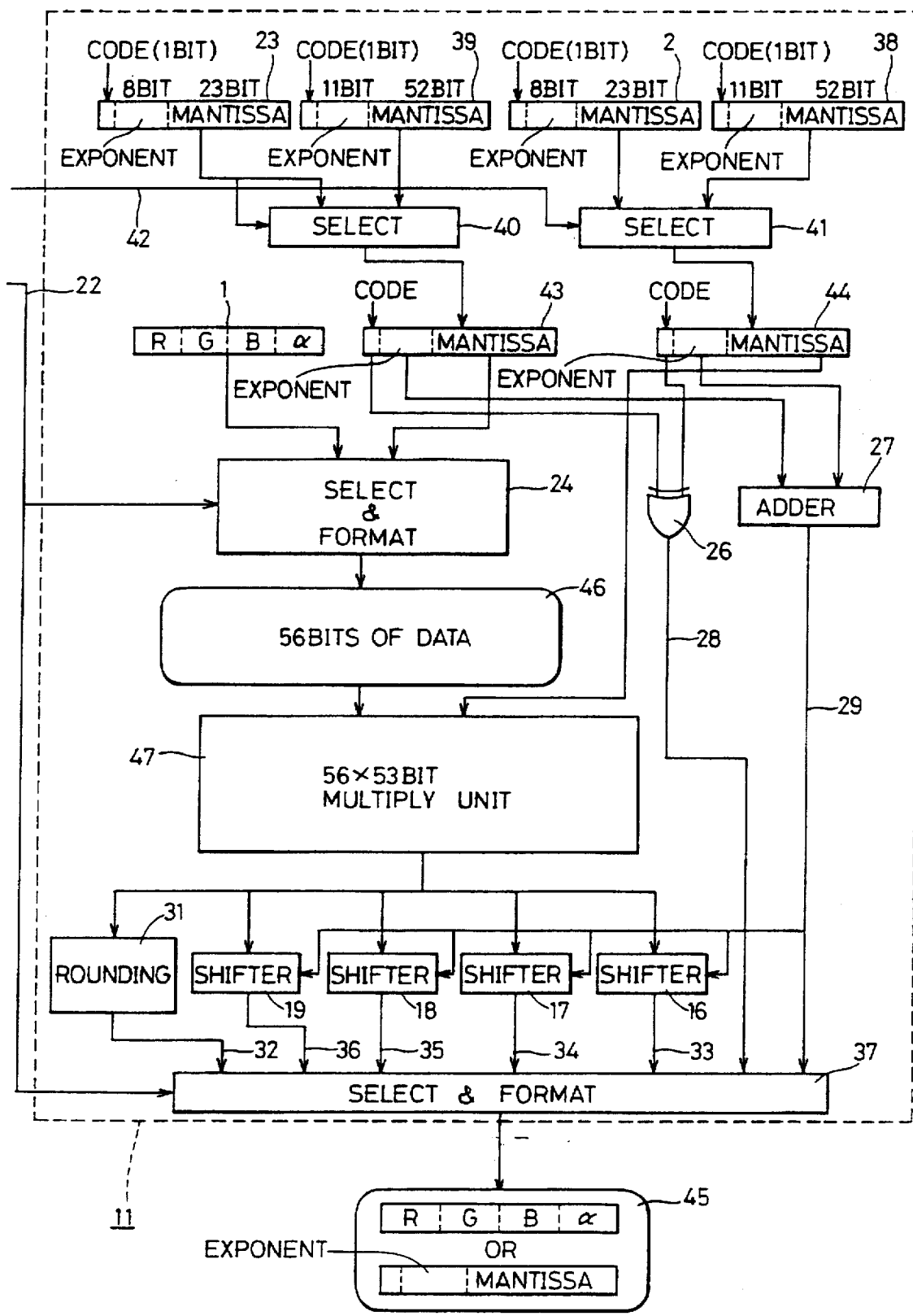

Referring to FIG. 7, an operation unit includes a selector 41 for selecting either of the inputs of single precision floating point data 2 and double precision floating point data 38, and a selector 40 for selecting either of the inputs of single precision floating-point data 23 and double precision floating-point data 39. The selection carried out by selectors 40 and 41 is based on a select signal 42 provided from floating-point operation control unit 102 shown in FIG. 1. Selectors 40 and 41 select either single precision floating point data or double precision floating point data to prepare floating-point data 43 and 44. Multiplier 11 receives and processes luminance value data 1 and floating point data 43 and 44. The structure and operation thereof are similar to those of the third and fourth embodiments, and their description will not be repeated.

According to the fifth embodiment, in addition to the single precision and double precision floating point multiply function, the multiplication function between a luminance value and single precision floating point data and between a luminance value and double precision floating point data can be executed with the addition of just a little hardware. Thus, a plurality of functions can be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiplier comprising:

first data input means for receiving first data representing luminance value data, second data input means for receiving second data expressed by floating-point data, operation means for carrying out operation of said first and second data directly with a hardware, and means for providing an operation result of said operation means in a format identical to that of said input luminance value data.

2. The multiplier according to claim 1, wherein said first data is defined by N components, each said component expressed by n1 bits, and said second data represented by m1 bits.

wherein said operation means further comprises
multiplication preparation means including means for dividing said first data into N components each of said n1 bits, and means for extracting a mantissa of said n1 bits from said second data, and
N of n1×n1 bit multiply units.

3. The multiplier according to claim 2, further comprising a plurality of shifters connected to each of said multiply units for shifting data obtained by said multiply unit.

4. The multiplier according to claim 3, wherein said first data comprises data of R, G and B.

5. The multiplier according to claim 1, wherein said first data is defined by N components, each of said components is expressed by n1 bits, and said second data is expressed by m1 bits,
wherein said operation means comprises multiplication preparation means and a multiply unit,
wherein said multiplication preparation means comprises means for dividing said first data into N components each of n1 bits, and means for extracting a mantissa including said n1 bits from said second data,
wherein said multiply unit comprises first data preparation means for preparing data of n1×(2N−1) bits in a hardware manner having n1 bits of 0 written between each data of said N components each represented by n1 bits, and carries out multiplication between said prepared n1×(2N−1) bits of data and said mantissa of n1 bits extracted from said second data.

6. The multiplier according to claim 5, further comprising shift means connected to each of said multiply units for shifting data obtained by said multiply units.

7. The multiplier according to claim 5, wherein said first data comprises data of R, G, and B.

8. The multiplier according to claim 5, further comprising:
third data input means for receiving third data represented by m1 bits of floating-point data, and
means for extracting a mantissa including n2 bits from said third data,
where said means for extracting the mantissa from said second data extracts a mantissa having n2 bits, and not n1 bits,
said multiplication preparation means further comprises select means responsive to an externally applied signal for selecting a first multiplication of said first data and said second data or a second multiplication of said second data and said third data, and
means for preparing data from said first data preparation means in the case of said first multiplication according to said selection, and preparing data from second data preparation means for preparing n1×(2N−1) bits of data having a mantissa of n2 bits at the lower significant level and having (n1×(2N−1)−n2) bits of 0 at the more significant level,
wherein said multiply unit carries out multiplication between said n1×(2N−1) bits of data prepared by said first or second data preparation means according to said selection and said n2 bits of data extracted from said second data.

9. The multiplier according to claim 8, wherein said second data and said third data are data of single precision.

10. The multiplier according to claim 9, further comprising rounding means and N shifters connected to said multiply units.

11. The multiplier according to claim 10, further comprising means responsive to said external signal for altering an output format depending upon operation of said first data or said second data.

12. The multiplier according to claim 8, wherein said second and third data are represented by m2 bits greater than said m1 bits, whereby means for extracting a mantissa from said second and third data extracts a mantissa of n3 bits,
wherein said second data preparation means responds to said selection for preparing data of n1×(2N−1) bits having a mantissa of n3 bits at the lower significant level and (n1×(2N−1)−n3) bits of 0 at the more significant level in the case of said second multiplication, and
wherein said multiply unit carries out multiplication of said prepared n1×(2N−1) bits of data and said n3 bits of data extracted from said second data.

13. The multiplier according to claim 12, wherein said second and third data are floating-point data of double precision.

14. The multiplier according to claim 13, further comprising rounding means and N shifters connected to said multiply unit.

15. The multiplier according to claim 14, further comprising means responsive to said external signal for altering an output format depending on operation of said first data or said second data.

16. The multiplier according to claim 12, further comprising:
means responsive to an externally applied signal for selecting said second and third data represented by said m1 and m2 bits, respectively, from fourth data expressed by said m1 bits and fifth data expressed by m2 bits greater than said m1 bits, and sixth data expressed by said m1 bits and seventh data expressed by said m2 bits, and
means responsive to an externally applied signal for converting data of n3 bits into data of n2 bits when said second and third data are m1 bits.

17. The multiplier according to claim 16, wherein said fourth and sixth data are one of luminance value data and single precision floating-point data.

18. The multiplier according to claim 17, wherein said fifth and seventh data are double precision floating-point data.

19. The multiplier according to claim 18, further comprising rounding means for rounding said multiplied result and N shifters.

20. The multiplier according to claim 19, further comprising means responsive to said external signal for altering an output format according to an operation depending on a combination of said fourth to seventh data.

* * * * *

UNITED STATES PATENT AND TRADEMARK OFFICE
CERTIFICATE OF CORRECTION

PATENT NO. : 5,666,301
DATED : September 9, 1997
INVENTOR(S) : Hiroshi MAKINO

It is certified that error appears in the above-identified patent and that said Letters Patent is hereby corrected as shown below:

On the title page, at [30], the foreign application priority date should be changed from 'May 29, 1994' to -- June 29, 1994 --.

Signed and Sealed this

Twenty-seventh Day of January, 1998

Attest:

BRUCE LEHMAN

Attesting Officer

Commissioner of Patents and Trademarks